United States Patent
Wigmore et al.

(10) Patent No.: US 8,301,811 B1
(45) Date of Patent: Oct. 30, 2012

(54) TECHNIQUES FOR PERFORMING ONLINE DATA MIGRATION WHILE EFFECTIVELY MIGRATING SCSI RESERVATIONS BETWEEN SOURCE AND TARGET ARRAYS

(75) Inventors: Ian Wigmore, Westborough, MA (US); Patrick Brian Riordan, West Newton, MA (US); Michael Scharland, Franklin, MA (US); Arieh Don, Newton, MA (US)

(73) Assignee: EMC Corporation, Hopkinton, MA (US)

( * ) Notice: Subject to any disclaimer, the term of this patent is extended or adjusted under 35 U.S.C. 154(b) by 207 days.

(21) Appl. No.: 12/750,388

(22) Filed: Mar. 30, 2010

(51) Int. Cl.
*G06F 3/00* (2006.01)
*G06F 13/12* (2006.01)
*G06F 13/38* (2006.01)

(52) U.S. Cl. .................. 710/74; 710/29; 710/15

(58) Field of Classification Search .................. 710/74, 710/29, 15
See application file for complete search history.

(56) References Cited

U.S. PATENT DOCUMENTS

| | | | |
|---|---|---|---|
| 7,434,022 B1 | 10/2008 | Scharland et al. | |
| 7,536,503 B1 | 5/2009 | Venkatanarayanan et al. | |
| 7,634,595 B1 | 12/2009 | Brown et al. | |
| 7,640,408 B1 | 12/2009 | Halligan et al. | |
| 7,689,786 B1 | 3/2010 | Riordan et al. | |
| 7,707,331 B1 | 4/2010 | Brown et al. | |
| 7,797,500 B1 | 9/2010 | Lewis et al. | |
| 7,856,022 B1 | 12/2010 | Wigmore | |
| 8,028,062 B1 | 9/2011 | Wigmore et al. | |
| 8,028,110 B1 | 9/2011 | Wigmore | |
| 8,060,710 B1 | 11/2011 | Don et al. | |
| 2005/0229021 A1* | 10/2005 | Lubbers et al. | 714/2 |
| 2008/0209254 A1* | 8/2008 | Bailey et al. | 714/2 |

* cited by examiner

*Primary Examiner* — Eddie P Chan
*Assistant Examiner* — Zachary K Huson
(74) *Attorney, Agent, or Firm* — BainwoodHuang (57) ABSTRACT

A technique migrates data from a source array to a target array while preserving SCSI reservation compliance. The technique involves providing an active-to-passive instruction to the source array while a first SCSI reservation enables hosts to access data on the source array using MPIO software. The active-to-passive instruction directs the source array to transition devices from active mode to passive mode and, upon receipt of a next SCSI instruction, output an indicator indicating that the first SCSI reservation has been cleared. The technique further involves transitioning devices of the target array from passive mode to active mode and beginning a data transfer operation which transfers data from the source array to the target array. The technique further involves automatically effectuating formation of a second SCSI reservation in place of the first SCSI reservation, the second SCSI reservation providing host access to the data on the target array using MPIO software.

23 Claims, 5 Drawing Sheets

FIG. 5

TECHNIQUES FOR PERFORMING ONLINE DATA MIGRATION WHILE EFFECTIVELY MIGRATING SCSI RESERVATIONS BETWEEN SOURCE AND TARGET ARRAYS

BACKGROUND

Multipath I/O (MPIO) is a feature which provides a host with the ability to utilize multiple physical paths to a data storage array. In particular, if the host is unable to perform an I/O operation on the data storage array through one physical path, the host is able to retry the I/O operation on that array through another physical path. PowerPath® which is offered by EMC Corporation of Hopkinton, Mass. is an example of a multipathing software product.

After a data storage array has been in use for a period of time, the owner of the array may wish to replace that original array with a newer array, i.e., to migrate from the original array to a replacement array perhaps with more capacity, faster processors, newer components, additional features, etc. Open Replicator for Symmetrix (ORS), which is offered by EMC Corporation, is an example of a software product which facilitates creation of point-in-time copies of data to enable effective data migration from an original array to a replacement array while a host maintains online access to host data, i.e., online data migration. Another example is Symmetrix Remote Data Facility (SRDF) which is also offered by EMC Corporation. There are other replication software products available as well.

One conventional approach to online data migration involves making the replacement array available to a host even though some or all of the host data may have not yet been transferred to the replacement array from the original array. That is, the replacement array starts copying the host data from the original array (i.e., a background copy task), but behaves to the host as if all of the host data already resides on the replacement array. Along these lines, if the replacement array receives a host I/O request for particular host data that has not yet been copied from the original array, the replacement array immediately copies that host data in response to the I/O request, i.e., a copy-on-demand operation. Once the replacement array receives the requested host data from the original array, the replacement array provides that host data to the host as well as stores that host data thereafter. This process of "hot pulling" host data from the original array in response to host I/O requests can continue in conjunction with standard background data copying until all of the host data has been copied from the original array to the replacement array.

SUMMARY

Some data migration endeavors may impose special requirements. For example, suppose that an original array is accessed by a cluster of hosts, and that the cluster of hosts uses small computer system interface (SCSI) reservations to coordinate exclusive access to storage devices on the original array. Along these lines, suppose that Host A requires exclusive read/write access to a particular storage device on the original array and thus sends a SCSI reserve command to the original array to impose a SCSI reservation on that storage device. In response to the SCSI reserve command, the original array reserves the storage device on behalf of Host A. In particular, the original array remembers the particular path (identified by the host via a logical pathname and/or a host key) through which the SCSI reserve command was received and performs read/write operations in response to SCSI commands received only through the reserved path. Accordingly, if the original array receives a SCSI command for a read/write operation from Host B (i.e., another host of the cluster) through a different path (or the same path), the original array provides a reservation conflict response to back to Host B and does not perform the read/write operation.

In this context, it should be understood that the SCSI reservations are either SCSI-2 reservations or SCSI group reservations. SCSI group reservations are offered on platforms provided by EMC Corporation of Hopkinton, Mass.

Now suppose that Host A dies. Host B can submit, through a different path than the reserved path, a SCSI device reset command which resets the storage device of the original array and the clears the reserved path. Following the reset, Host B is able to reserve the storage device on the original array.

Unfortunately, there is no available approach for migrating SCSI reservations between the original array and the replacement array during seamless data migration. Along these lines, any attempt to properly transfer reservation data directly between the original array and the replacement array would be a complicated endeavor, and still would require some form of cooperation from the hosts.

In contrast, improved techniques involve performing seamless online data migration from a source array to a target array while effectively migrating SCSI reservations between the source array and the target array. In particular, the arrays are configured to return reservation cleared indicators in response to SCSI instructions at particular times in the migration process. Such reservation cleared indicators inform the hosts that any earlier-stored SCSI reservation information with the source array no longer exists. As a result, when the hosts attempt to re-establish (or renew) SCSI reservations, the SCSI reservations are then re-established with the target array thus providing a smooth migration of SCSI reservations from the source array to the target array (i.e., there is no need for a complicated transfer of reservation data between arrays). Similarly, if there is failback to the source array during the migration process, the source and target arrays provide reservation cleared indicators to cause the hosts to re-establish SCSI reservations again with the source array thus providing a smooth migration of SCSI reservations back to the source array.

Some embodiments are directed to a method of seamlessly migrating host data from a source array to a target array while preserving SCSI reservation compliance. The technique involves providing an active-to-passive instruction to the source array while a first SCSI reservation enables a set of hosts (e.g., a cluster) to access host data on a storage device of the source array using MPIO software. The active-to-passive instruction directs the source array to (i) transition the source device from active mode to passive mode and, (ii) upon receipt of a next SCSI instruction, output a reservation cleared indicator indicating that the first SCSI reservation has been cleared (e.g., a SCSI response having a sense key indicating that the storage device was just reset even though the storage device was not just reset). The technique further involves transitioning a storage device of the target array from passive mode to active mode and beginning a data transfer operation which transfers host data between storage devices of the arrays. The technique further involves establishing a second SCSI reservation in place of the first SCSI reservation, the second SCSI reservation enabling the set of hosts to access the data on the storage device of the target array using the MPIO software during the data transfer operation.

In some arrangements, the source array is constructed and arranged to automatically transition the storage device from passive mode back to active mode in response to a detection of a failure event in which the source array does not receive a heartbeat signal from the target array during a predefined amount of time. In these arrangements, the target array periodically sends a new heartbeat signal to the source array to prevent the source array from automatically transitioning the storage device back to active mode.

Additionally, some embodiments are directed to a data storage array which operates as a target array during online data migration while preserving SCSI reservation compliance. Furthermore, some embodiments are directed to a data storage array which operates as a source array during online data migration while preserving SCSI reservation compliance. Also, some embodiments are directed to computer program products which enable computer logic to operate as the circuitry for the target and source arrays during online data migration while preserving SCSI reservation compliance.

BRIEF DESCRIPTION OF THE DRAWINGS

The foregoing and other objects, features and advantages will be apparent from the following description of particular embodiments of the invention, as illustrated in the accompanying drawings in which like reference characters refer to the same parts throughout the different views. The drawings are not necessarily to scale, emphasis instead being placed upon illustrating the principles of various embodiments of the invention.

DETAILED DESCRIPTION

Overview

An improved technique involves online data migration while effectively migrating small computer system interface (SCSI) reservations between a source array and a target array. In particular, the arrays are configured to return reservation cleared indicators in response to SCSI instructions at particular times in the migration process. Such indicators (e.g., "reset" status indicators) inform the hosts that any earlier-established SCSI reservation information at the source array no longer exists thus allowing the hosts to re-establish (or renew) the SCSI reservations. When the hosts re-establish the SCSI reservations, the SCSI reservations are now with the target array thus providing a smooth migration of SCSI reservations from the source array to the target array. Additionally, if there is failback to the source array during the migration process, the source array provides reservation cleared indicators to cause the hosts to re-establish the SCSI reservations again with the source array thus providing a smooth migration of SCSI reservations back to the source array.

Figure 1:
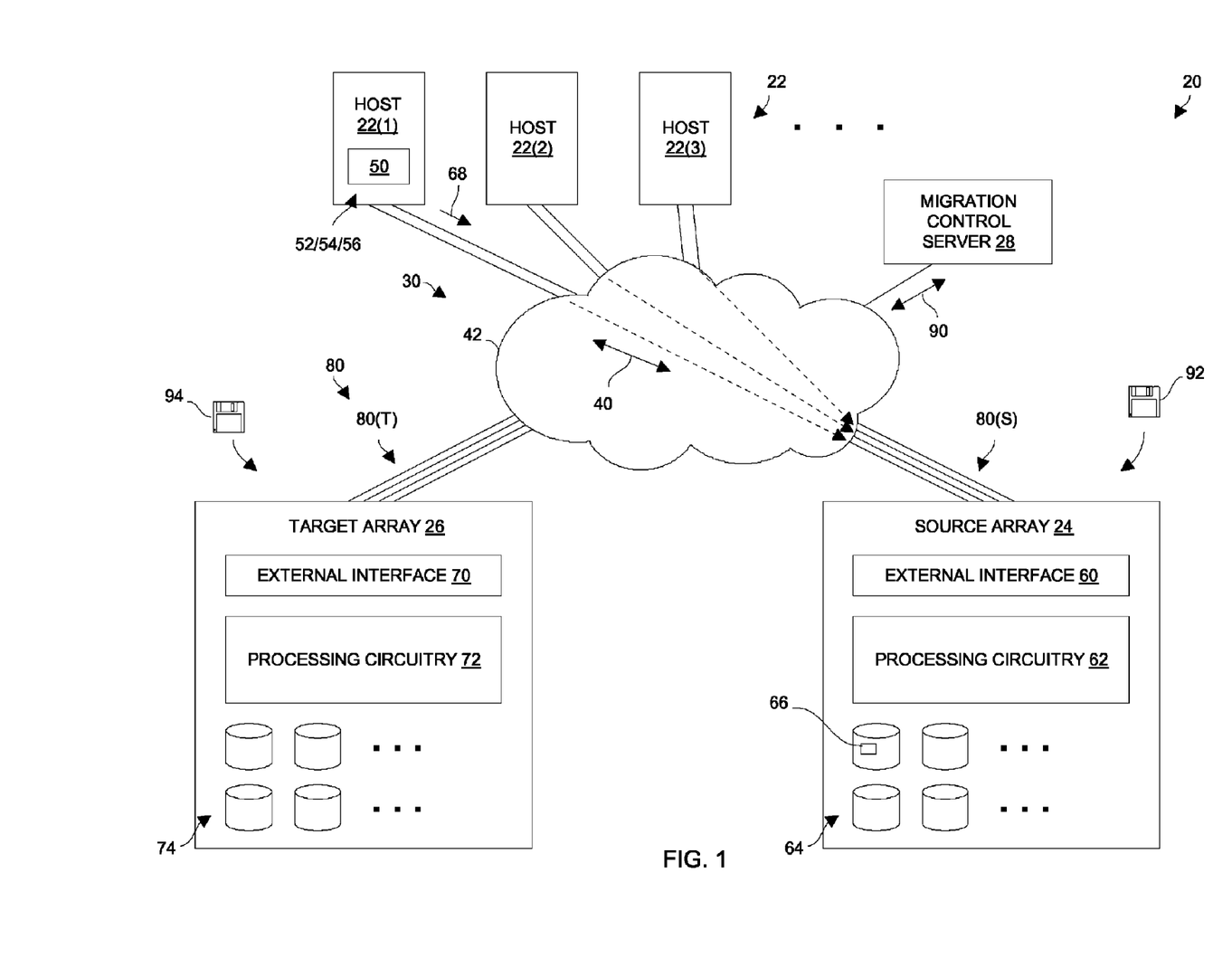
FIG. 1 is a block diagram of a computerized environment which migrates SCSI reservations during seamless online data migration.

FIG. 1 is a block diagram of a computerized environment 20 which is constructed and arranged to migrate SCSI reservations during an online data migration process. The computerized environment 20 includes hosts 22(1), 22(2), 22(3), . . . (i.e., collectively, hosts 22), a source data storage array 24, a target data storage array 26, a migration control server 28, and a communications medium 30. The hosts 22 may form a cluster and coordinate exclusive access to host data using SCSI reservations.

The communications medium 30 is constructed and arranged to convey electronic signals 40 between the various components of the computerized environment 20. Along these lines, the communications medium 30 may implement a variety of protocols such as small computer system interface (SCSI), Fibre Channel, FICON, TCP/IP, Ethernet, combinations thereof, and the like. Furthermore, at least part of the communications medium 30 is illustrated as a network cloud 42 since the communications medium 30 (i) may include various additional components (e.g., cables, switches, gateways/bridges, other SAN/NAS communications devices and interfaces, etc.) and (ii) is capable of having a variety of topologies (e.g., switched fabric, hub-and-spoke, ring, backbone, multi-drop, point-to-point, irregular, combinations thereof, etc.).

Each host 22 (e.g., see host 22(1)) includes computerized circuitry 50 (e.g., a set of processors, memory, host bus adaptors, etc.) which is constructed and arranged to perform host input/output (I/O) operations on the arrays 24, 26. To this end, each host 22 is equipped with a variety of software constructs (see host 22(1)) including an operating system 52, multipath I/O software 54, and other applications 56 (e.g., a database application). To coordinate storage device access, the hosts 22 employ SCSI reservations (e.g., SCSI-2 reservations, SCSI group reservations, etc.). Furthermore, the MPIO software 54 running on each host 22 is configured to attempt to re-establish an existing SCSI reservation if the MPIO software 54 sees that the SCSI reservation information at the source array 24 or the target array 26 has been cleared.

Additionally, the source data storage array 24 (i.e., source array 24) includes an external interface 60, source array processing circuitry 62, and source storage devices 64 (i.e., source devices 64) which initially store host data 66 which is accessed by the hosts 22 via host I/O commands 68 (e.g., see host 22(1)). Similarly, the target data storage array 26 (i.e., target array 26) includes an external interface 70, source array processing circuitry 72, and target storage devices 74 (i.e., target devices 74) which are constructed and arranged to eventually receive the host data 66 and process further host I/O commands 68.

For simplicity, the host data 66 is shown in FIG. 1 as a block within one of the source devices 64. However, it should be understood that the host data 66 may initially reside in a distributed manner across multiple source devices 66.

In some arrangements, one or more of the arrays 24, 26 includes front-end adaptors (FAs), a cache (e.g., global memory), and disk adaptors (DAs). In these arrangements, the FAs (which are sometimes referred to as front-end directors or host adaptors) operate as interfaces between the hosts 22 and the cache. Similarly, the DAs (which are sometimes referred to as back-end directors or disk controllers) operate as interfaces between the cache and the storage devices 64, 74. For these arrangements, appropriately configured Symmetrix® storage systems which are provided by EMC Corporation of Hopkinton, Mass. are suitable for use as one or more of the data storage arrays 24, 26.

As shown in FIG. 1, multiple physical links 80 lead to external interfaces 60, 70 of the data storage arrays 24, 26. In particular, multiple physical links 80(S) (e.g., four physical links) lead to the external interface 60 (e.g., multiple FA ports) of the source array 24. Similarly, multiple physical links 80(T) (e.g., another four physical links) lead to the external interface 70 (e.g., multiple FA ports) of the target array 26.

The processing circuits 62, 72 of the arrays 24, 26 are constructed and arranged to present, to the hosts 22, each storage device 64, 74 as operating in either an active mode or a passive mode. A storage device 64, 74 may or may not be able to properly process certain types of host I/O commands 68 and SCSI reservations depending on which mode the storage device 64, 74 is currently in.

In particular, in active mode, a storage device 64, 74 is able to perform host read/write I/O operations (e.g., SCSI read or write operations to access host data 66) in response to host read/write I/O requests, SCSI reservations, and host control operations (e.g., respond to inquiry and mode sense SCSI commands from the hosts 22).

In passive mode, a storage device 64, 74 is only able to perform host control operations (e.g., inquiry, mode sense, read capacity, etc.). If a storage device 64, 74 receives a host read/write I/O request or a SCSI reservation request while in passive mode, that storage device 64, 74 immediately responds with an error message (e.g., responds with a check condition status code) and does not perform the requested operation.

Prior to migration and as shown in FIG. 1, the hosts 22 are able to perform I/O operations on the source array 24 through the communications medium 30 (e.g., see the dashed arrows within the cloud 42). Here, each source storage device 62 of the source arrays 24 is initially in the active mode, and has the ability to provide and release SCSI reservations with the hosts 22 in response to host SCSI commands. Furthermore, each host 22 runs the MPIO software 54 which is appropriately configured (i.e., established switch zones, established logical pathnames, etc.) to robustly and reliably enable the host applications 56 to access the host data 66 distributed across the source devices 64.

While the hosts 22 have online access to the source array 24, the migration control server 28 is capable of communicating with various components of the computerized environment 20 through the communications medium 30, i.e., see the arrow 90 in FIG. 1. For example, the migration control server 28 can communicate directly with the target arrays 26 using system calls and/or vendor unique control commands to set up and start the data migration process. Here, it is assumed that the target arrays 26 are contemporary machines which are constructed and arranged to receive and implement configuration instructions from the migration control server 28 as well as properly respond to such instructions, e.g., to provide operational status of the individual target devices 74.

Additionally, the target array 26 and the source array 24 are constructed and arranged to communicate with each other directly through the communications medium 30. Along these lines, the target array 26 is able to exchange data with the source array 24 directly, and to provide control instructions to the source array 24. For example, the target array 26 is able to provide standard SCSI commands and/or vendor unique control commands to the source array 24, as well as receive standard SCSI responses (e.g., SCSI status codes) and/or vendor unique responses from the source array 24. Accordingly, it is not necessary that the migration control server 28 be able to communicate directly with the source array 24 through the communications medium 30 although such a situation may be possible.

Rather, if the source array 24 is not equipped to handle system calls from the migration control server 28 directly or not connected to the migration control server 28, the migration control server 28 is able to control the source array 24 via system calls and/or SCSI commands to the target array 26. In turn, target array 26 sends standard commands and/or vendor unique commands to the source array 24 (i.e., command tunneling). Similarly, the migration control server 28 can receive status from the source array 24 by configuring the target array 26 to relay status that the target array 26 obtains from the source array 24 (perhaps with additional information) as the source array 24 responds to the commands from the target array 26.

It should be understood that the processing circuits 62, 72 of each array 24, 26 preferably includes processors and memory in order to run software which is capable of being delivered to and installed from a respective computer program product 92, 94 (illustrated generally by the diskette icons). Each computer program product 92, 94 includes a non-transitory computer readable storage medium which stores, in a non-volatile manner, information that is utilized by the processing circuits 62, 72. Examples of suitable computer readable storage media include CD-ROM, magnetic disk or tape cartridges, flash memory, disk memory, and the like.

Online Data Migration

When the computerized environment 20 is ready to begin online data migration, each host 22 has established pathnames through the physical links 80 to each array 24, 26. In particular, the target array 26 is set up to appear as though it is simply part of the source array 24. Along these lines, the target array 26 is provisioned with the same array identifier (i.e., array ID) as the source array 24. Furthermore, the target devices 74 are provisioned with the same storage device identifiers (i.e., device IDs) as those of the source devices 64. Then, the MPIO software 54 running on each host 22 is presented access to the target array 26 enabling that host 22 to establish logical pathnames to the target devices 74 of the target array 26 which appear to the host 22 as additional paths to the same source devices 64 of the source array 24. However, the source array 24 initially presents the source devices 64 to the hosts 22 in active mode, and the target array 26 initially presents the target devices 74 to the hosts 22 in passive mode.

Additionally, the migration control server 28 is able to exchange communications 90 directly to the target array 26, and at least indirectly to the source array 24 through the target array 26 (i.e., command tunneling). In particular, the migration control server 28 is able to effectively direct progress of the arrays 24, 26 through the online migration process by providing instructions to the target array 26 and receiving back responses from the target array 26 to confirm proper progress. In some arrangements, the migration control server 28 is able to provide system calls to the target array 26 to direct target array operation, as well as order the target array 26 to send instructions (e.g., standard SCSI commands, vendor specific SCSI commands, etc.) to the source array 24 on behalf of the migration control server 28.

With the migration process about to start, it should be understood that the hosts 22 are able to coordinate exclusive access to the host data 66 using SCSI reservations. Along these lines, the hosts 22 may form a cluster for fault tolerance and load balancing purposes. To this end, suppose that the host 22(1) acquires a SCSI reservation to a particular source device 64 of the source array 24 through a particular logical pathname (e.g., a combination of the array ID and FA port number of the source array to the source device 64 identified by the device ID). If a different host 22 (e.g., the host 22(2)) sends a read/write I/O command to the particular source device 64 through another path, that different host 22 receives back a "reservation conflict" message from the source array 24 and the read/write I/O command is not performed. Further details will now be provided with reference to FIG. 2.

Figure 2:
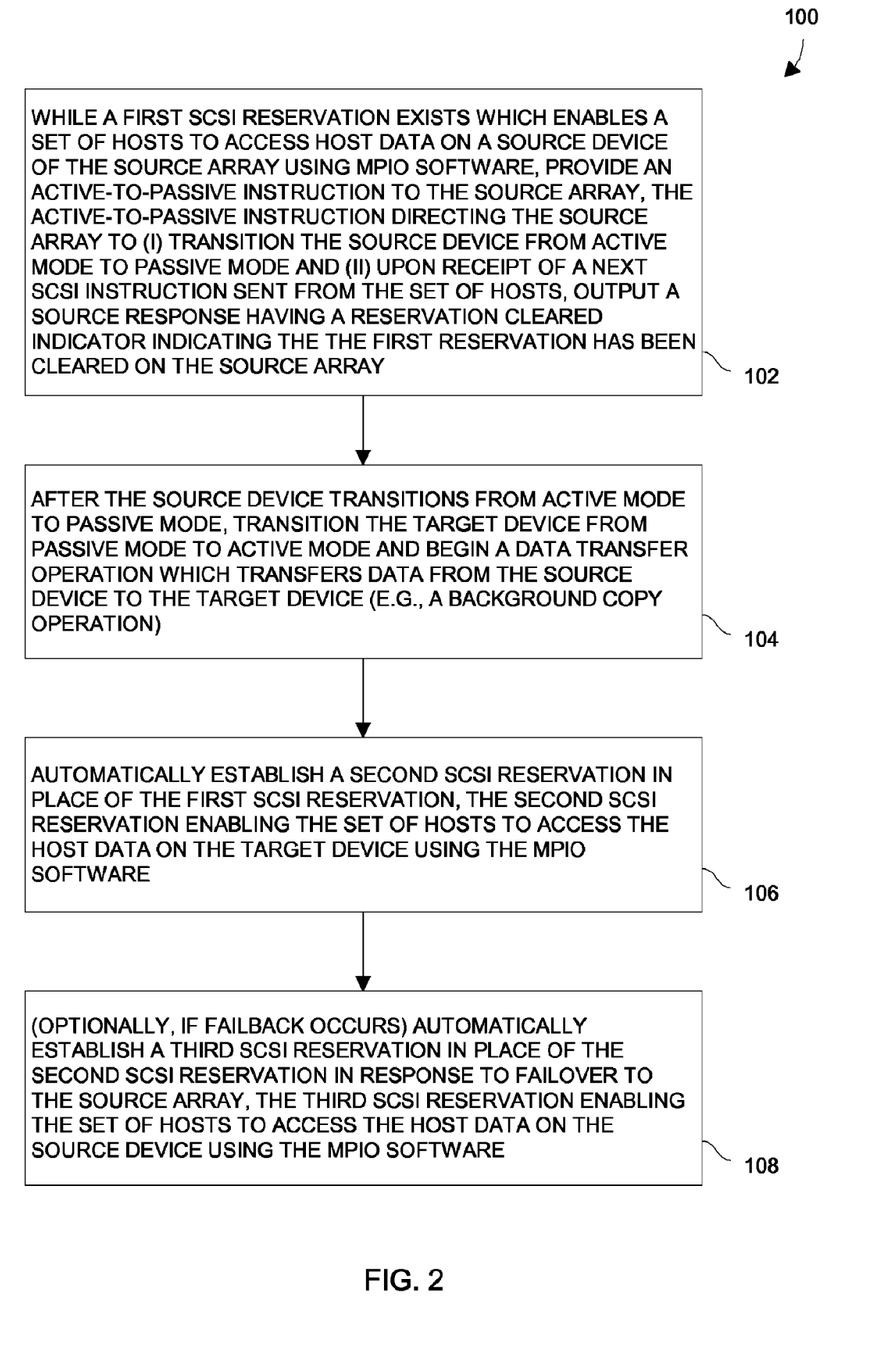
FIG. 2 is a flowchart of a procedure which is performed within the computerized environment of FIG. 1 during seamless online data migration.

FIG. 2 is a flowchart of a procedure 100 which is performed by the computerized environment 20 during online data migration and while effectively migrating SCSI reservations between the source and target arrays 24, 26. When data migration begins, it is assumed that the hosts 22 have been accessing the host data 66 from the source devices 64 of the source array 24 using SCSI reservations for exclusive access. Such access using SCSI reservations may have gone on with the source array 24 for some extended amount of time.

In step 102, while a first SCSI reservation exists which enables a host 22 to access host data 66 on a source device 64 of the source array 24 using the multipath I/O software 54 (e.g., identified by host key, host ID, etc.), the target array 26 provides an active-to-passive instruction to the source array 24. In some arrangements, the target array 26 provides active-to-passive instructions for each source device 64 in response to a migration start command from the migration control server 28 (also see FIG. 1). The active-to-passive instruction directs the source array 24 to (i) transition the source device 64 from active mode to passive mode and (ii) upon receipt of a next SCSI instruction sent from the host 22 to the source device 64, output a source device response to the host 22. The source device response includes a reservation cleared indicator indicating that the first SCSI reservation has been cleared on the source array 24.

In step 104, after the source device 64 transitions from active mode to passive mode, the target array 26 transitions the corresponding target device 74 of the target array 26 from passive mode to active mode and begins a data transfer operation which transfers data from the source device 64 to the target device 74. At this point, the target array 26 is configured to perform copy-on-demand operations if the target array 26 receives a host read/write I/O operation relating to host data 66 that has not yet been copied from the source array 24. For such host data 66, the target array 26 is configured to "hot pull" that host data 66 out of copy order from the source array 24 in order to satisfy the host read/write I/O operation.

In step 106, the target array 26 communicates with the host 22 to establish a second SCSI reservation in place of the first SCSI reservation. In particular, once the host 22 receives the reservation cleared indicator from the source array in response to the next SCSI instruction, the host 22 tries to re-establish the SCSI reservation to the source device 64 perhaps down the same path as the first SCSI reservation. However, since the source device 64 is now in passive mode, the host 22 reservation is rejected and the host 22 eventually tries down a new path and is able to re-establish the SCSI reservation through a path to the corresponding target device 74 using the multipath I/O software. This second SCSI reservation now enables the host 22 to access the host data 66 on the target device 74. It should be understood that, from the perspective of the host 22, the second SCSI reservation to the target device 74 is simply re-establishment of the earlier-formed SCSI reservation to the source device 64.

Figure 3:
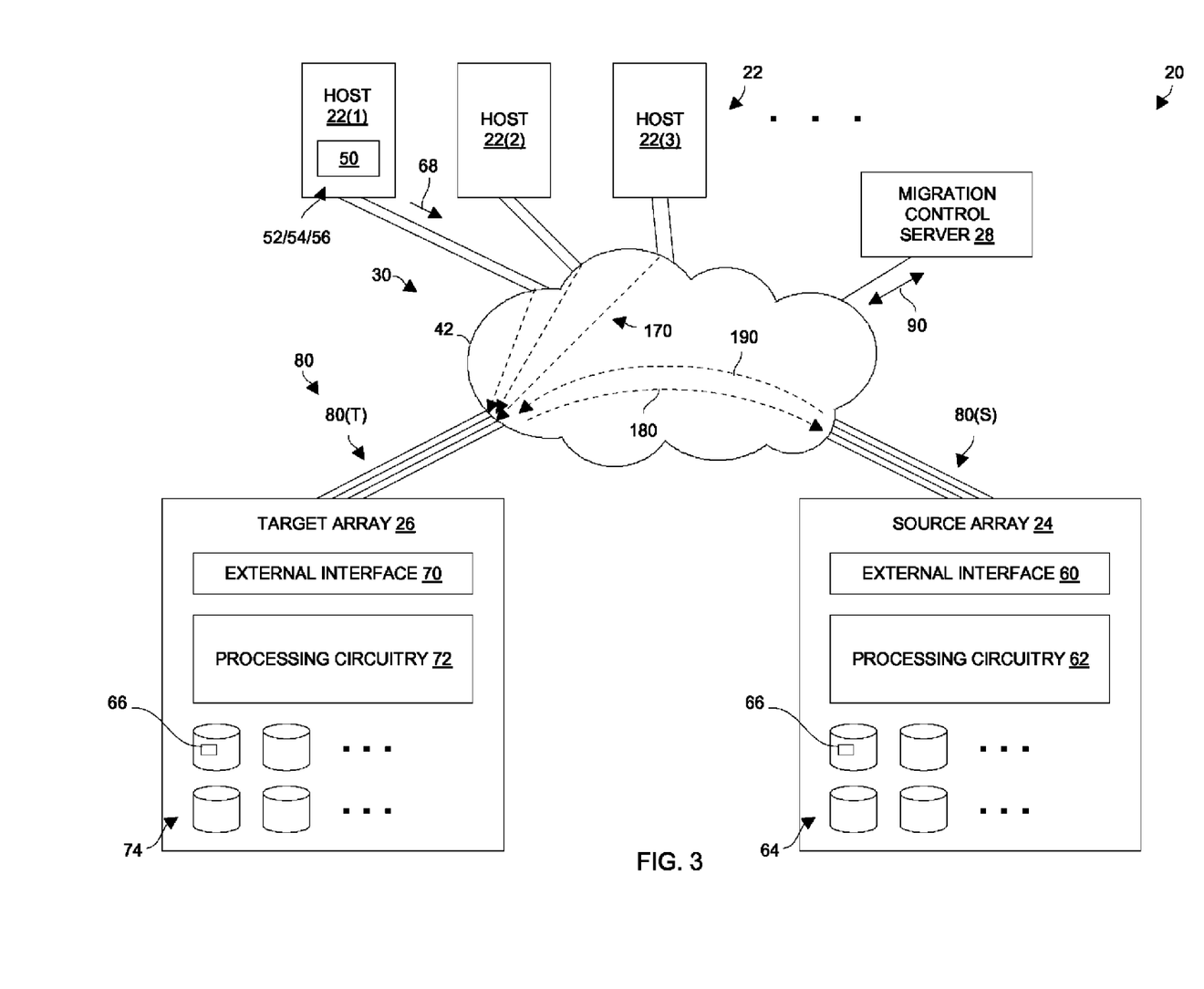
FIG. 3 is a block diagram of the computerized environment of FIG. 1 during online seamless data migration.

FIG. 3 shows the computerized environment once the target array 26 provides the hosts 22 with access to the host data 66. In particular, the dashed arrows 170 represent the ability of the hosts 22 to fulfill read/write I/O commands as well as SCSI reservations on the target array 26. Additionally, the dashed arrows 180, 190 between the target array 26 and the source array 24 illustrate direct communications between the arrays 26, 24 (e.g., to hot pull data from the source array 24 to the target array 26, heartbeat/handshaking signals, donor updates, etc.).

It should be understood that once the data migration process completes, the hosts 22 continue to have access to the host data 66 via the target array 26. In particular, the hosts 22 can establish SCSI reservations with the target devices 74 of the target array 26 in order to fully access the host data 66 from the target array 26 in the same manner as with the source array 24 prior to starting the data migration process.

It should be further understood that the target array 26 provides donor update commands to the source array 24 so that all data modifications on the target array 26 are carried out by the source array 24 as well. Along these lines, modification commands from the hosts 22 (i.e., host writes) are responded to with completion messages only after the target array 26 confirms that the same data modifications have been made on both arrays 24, 26. Accordingly, the source array 24 maintains a fully updated copy of the host data 66 at all times.

Furthermore, arrays 24, 26 exchange heartbeat signals with each other (see dashed arrows 180, 190 in FIG. 3) to enable the operation of the computerized environment 20 to fail back to the source array 24. In particular, if the arrays 24, 26 lose contact with each other for a predefined amount of time, the source array 24 transitions the source devices 64 back to the active mode, and the target array 26 (if still operational) transitions the target devices 74 back to passive mode. As a result, the hosts 22 are able to access the host data 66 from the source array 24.

With reference back to FIG. 2, in step 108, the host 22 automatically establishes a third SCSI reservation in place of the second SCSI reservation due to failover to the source array 24. The third SCSI reservation enables the host 22 to access the host data 66, which is fully up-to-date, from the source device 64 using the MPIO software 54. Further details of the reservation cleared indicator will now be provided.

Migration of SCSI Reservations During Online Data Migration

Migration of a SCSI reservation from a first array to a second array means, in actuality, (i) clearing a first SCSI reservation from a host 22 to a storage device on the first array and (ii) creating a second SCSI reservation from the host 22 to a corresponding storage device on the second array. From the host's perspective, the host 22 has simply re-established its SCSI reservation with the same storage device on the same array.

Recall that the data migration process involves transitioning source devices to passive mode, and corresponding target devices to active mode. When the source array 24 processes an instruction to transition its source devices 64 to passive mode, the source array 24 configures itself to respond to the next SCSI instruction to a SCSI reserved source device 64 with a special return code having the reservation cleared indicator. Additionally, when the target array 26 processes an instruction to transition its target devices 74 to active mode, the target array 26 configures itself to respond to the next SCSI instruction to each target device 74 with the special return code having the reservation cleared indicator. Upon receipt of each reservation cleared indicator, the host 22 re-establishes the SCSI reservations, but now with the target devices 74 of the target array 26.

Operation occurs in this response-style manner since the hosts 22 are the initiators of SCSI commands. In some arrangements, the reservation cleared indicator is a SCSI status code indicating that the particular storage device holding the reservation has been reset even though that storage device is not actually reset (it is not necessary nor desirable to reset that storage device). The sense key "6h" (i.e., Unit Attention—Drive may have been reset) is well suited for indicating to a host 22 that the reservation information for that particular storage device has been cleared.

Figure 4:
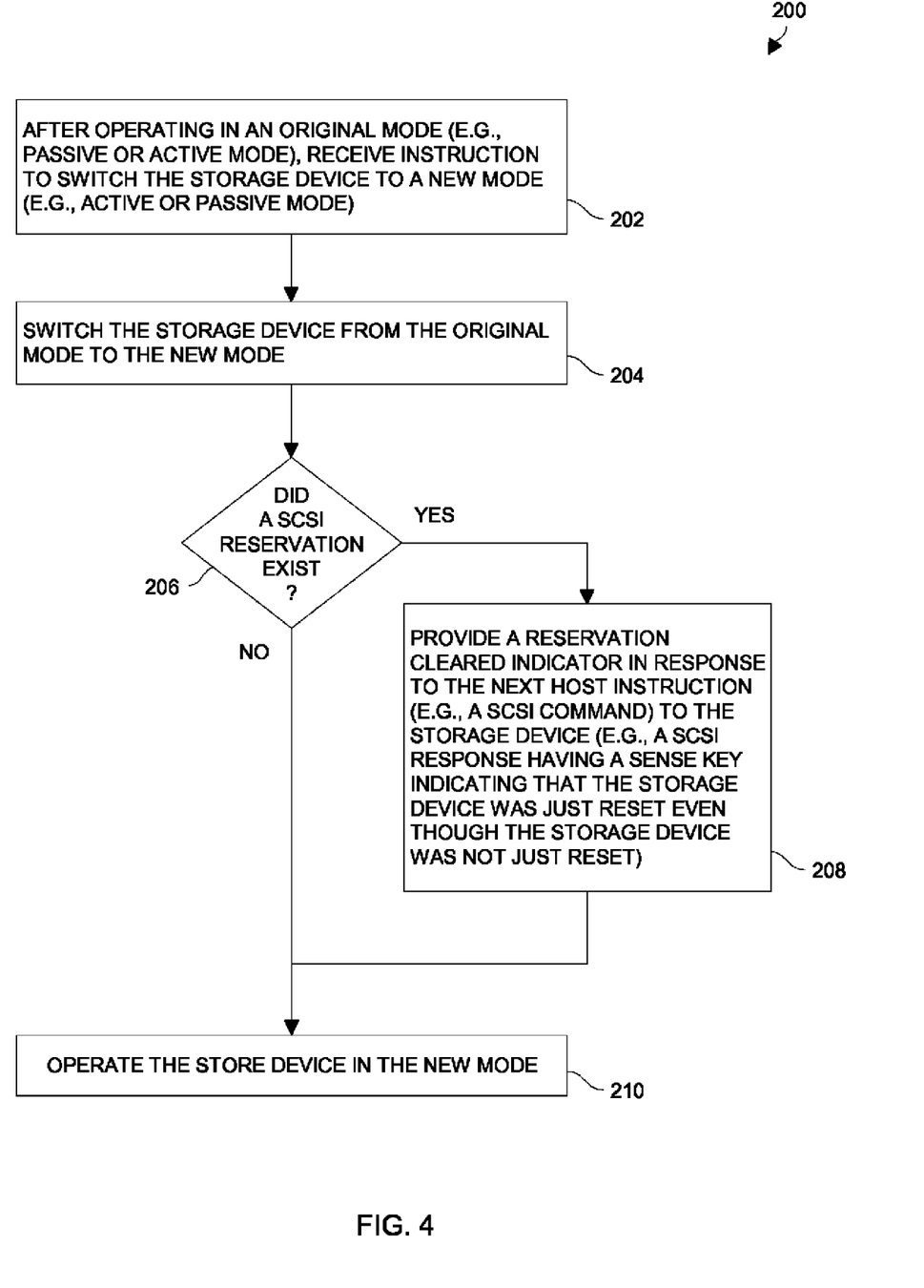
FIG. 4 is a flowchart of a procedure which is performed within an array to effectuate re-establishment of a SCSI reservation by a host.

FIG. 4 is a flowchart of a procedure 200 which is used as part of the data migration process (also see FIG. 2) to migrate SCSI reservations between the arrays 24, 26. In particular, an array 24, 26 performs the procedure 200 when receiving a command to transition a particular storage device from one mode to another (e.g., active mode to passive mode).

In step 202, the array 24, 26 receives an instruction to switch a storage device from an original mode to a new mode. For example, in step 102 of FIG. 2, the source array 24 is instructed to switch a source device 64 from active mode to passive mode.

In step 204, the array 24, 26 performs the mode switch for the storage device. Step 204 then proceeds to step 206.

In step 206, the array 24, 26 determines whether a SCSI reservation existed for that storage device. If so, step 206 proceeds to step 208. If not, step 208 proceeds to step 208.

In step 208, the array 24, 26 provides the reservation cleared indicator in response to the next SCSI instruction from the host 22. That is, the array 24, 26 waits until the host 22 sends a new SCSI instruction (e.g., a read/write command) down the reserved path to the storage device. Upon receipt of that next SCSI instruction, the array 24, 26 immediately replies with reservation cleared indicator and does not process the SCSI instruction. Step 208 then proceeds to step 210.

In step 210, the array 24, 26 operates the storage device in the new mode. For example, in step 102 of FIG. 2, the new mode for the source device 64 of the source array 24 is the passive mode.

As a result of the host 22 receiving the reservation cleared indicator from the array 24, 26 in step 208, it should be understood that the host 22 now knows that the reservation information has been cleared and that the host 22 must re-establish its reservation to the storage device and then retry the SCSI instruction. However, if the storage device is now in passive mode (e.g., see step 102 of FIG. 2), the host 22 re-establishes the SCSI reservation with the corresponding storage device of the other array 24, 26 since the storage devices of the other array 24, 26 are in active mode. For example, if a host 22 receives a reservation cleared indicator from the source array 24 after the source device 64 has transitioned to passive mode, the host 22 will find that the corresponding target device 74 on the target array 74 is in active mode and be successful at re-establishing the SCSI reservation but with the target device 74 (e.g., step 106 of FIG. 2).

Figure 5:
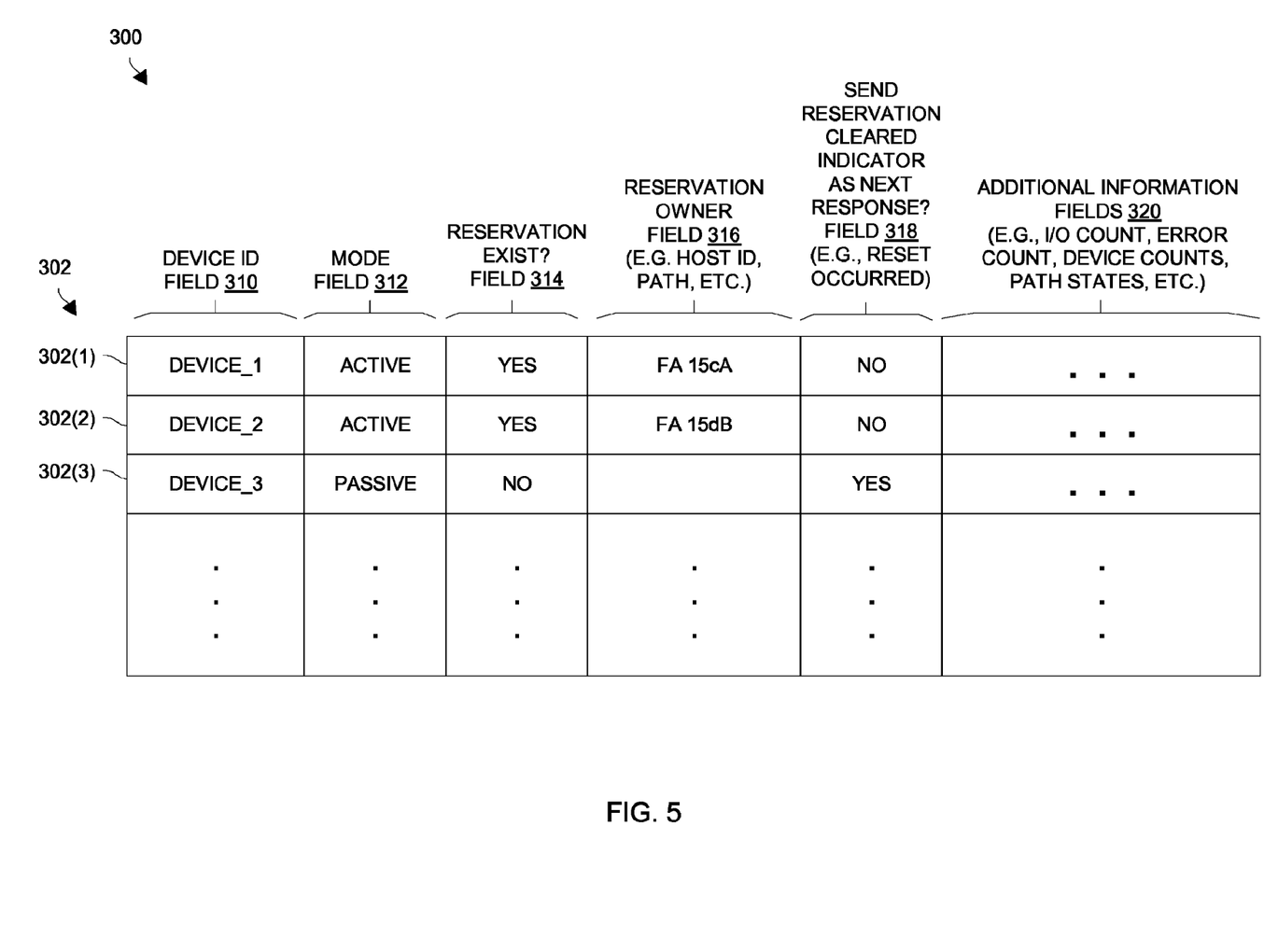
FIG. 5 is a block diagram of information which is utilized by an array of the computerized environment of FIG. 1 when effectuating re-establishment of a SCSI reservation by a host.

FIG. 5 shows a table 300 which is suitable for use by the arrays 24, 26 when the arrays 24, 26 perform the procedure 200 in FIG. 4. In particular, each array 24, 26 maintains its own table 300 to track which storage devices have SCSI reservations, and whether the array 24, 26 needs to issue a reservation cleared indicator in response to receipt of the next SCSI instruction.

As shown in FIG. 5, the table 300 includes entries 302(1), 302(2), 302(3) (collectively, entries 302) corresponding to each storage device of the array. Each entry 302 includes a device ID field 310, a mode field 312, a reservation exist? field 314, a reservation owner field 316, a send reservation cleared indicator as next response? field 318, and additional information fields 320.

The device ID field 310 of each entry 302 holds, as its contents, a device ID which identifies the storage device associated with that entry 302. The mode field 312 indicates the mode of that storage device (e.g., active or passive mode).

The reservation exists? field 314 indicates whether a reservation currently exists for the storage device from the perspective of the array. If a reservation does exist, the reservation owner field 316 identifies the owner. In some arrangements, the owner can be identified by host (e.g., host ID, host name, etc.). In other arrangements, the owner can be identified by path to the array (e.g., pathname, FA port number, etc.).

The send reservation cleared indicator as next response? field 318 indicates whether the array is configured to send the reservation cleared indicator in response to the next SCSI instruction from a host 22. When the array receives the instruction to switch modes (also see step 202 of FIG. 4) for a storage device and a SCSI reservation exists for that storage device, the array sets the contents of this field 318 to "YES" and clears the information in field 316. Then, upon receipt of a next SCSI command for that storage device, the array checks the contents of this field 318 and, since it is set to "YES", sends the reservation cleared indicator to effectively inform the host 22 that the SCSI reservation information has been cleared and that any SCSI reservation must be re-established. The array then resets the contents of the field 318 to "NO" and does not perform the requested SCSI operation. The entry 302(3) is an example of an entry 302 which directs the array to send the reservation cleared indicator upon the next SCSI command to the storage device identified by DEVICE_3.

The table 300 includes additional information fields 320 which contain further information. Such information may include I/O counts, error counts, device counts, path states, and so on.

Since the target array 26 (as well as the source array 24) is equipped with a table 300, the target array 26 is able to direct the host 22 to attempt to re-establish a SCSI reservation when the target devices 74 transition to active mode (see step 104 in FIG. 2). That is, the target array 26 is configured to use the table 300 in a similar manner as that of the source array 24 in order to issue reservation cleared indicator in response to the first SCSI command from a host for each target device 74. Such operation is well suited for hosts 22 which are configured to retry SCSI commands down a different path at the first sign of trouble of a tried path.

Furthermore, if operation fails back to the source array 24, the source array automatically sets the contents of the field 318 to "YES" for all of the entries 302. Accordingly, the hosts 22 re-establish the SCSI reservations with the source devices 64 of the source array 24 during failover.

CONCLUSION

As mentioned above, an improved technique involves performing seamless online data migration from a source array 24 to a target array 26 while effectively migrating SCSI reservations between the source array 24 and the target array 26. In particular, the arrays 24, 26 are configured to return reservation cleared indicators in response to SCSI instructions at particular times in the migration process. Such reservation cleared indicators (e.g., bus device reset or similar "reset" status indicator) inform the hosts 22 that any earlier-established SCSI reservation with the source array 24 no longer exists. As a result, when the hosts 22 attempt to re-establish (or renew) SCSI reservations, the SCSI reservations are then with the target array 26 thus providing a smooth migration of SCSI reservations from the source array 24 to the target array 26 (i.e., there is no need for a complicated transfer of reservation data between arrays). Similarly, if there is failback to the source array 24 during the migration process, the target array 26 provides reservation cleared indicators to cause the hosts 22 to re-establish SCSI reservations again with the source array 24 thus providing a smooth migration of SCSI reservations back to the source array 24.

While various embodiments of the invention have been particularly shown and described, it will be understood by those skilled in the art that various changes in form and details may be made therein without departing from the spirit and scope of the invention as defined by the appended claims.

What is claimed is:

1. A method of migrating data from a storage device of a source array to a storage device of a target array while preserving small computer system interface (SCSI) reservation compliance, each storage device being capable of operating in (i) an active mode in which that storage device is permitted to perform host read and write operations and (ii) a passive mode in which that storage device is not permitted to perform host read and write operations, the method comprising:

while a first SCSI reservation exists which enables a set of hosts to access host data on the storage device of the source array using multipath I/O software, providing an active-to-passive instruction to the source array, the active-to-passive instruction directing the source array to (i) transition the storage device of the source array from the active mode to the passive mode and (ii) upon receipt of a next SCSI instruction sent from the set of hosts to the storage device of the source array, output a source response to the set of hosts, the source response having a reservation cleared indicator indicating that the first SCSI reservation has been cleared on the source array;

after the storage device of the source array transitions from the active mode to the passive mode, transitioning the storage device of the target array from the passive mode to the active mode and beginning a data transfer operation which transfers data from the storage device of the source array to the storage device of the target array; and after the storage device of the target array transitions from the passive mode to the active mode, establishing a second SCSI reservation in place of the first SCSI reservation, the second SCSI reservation enabling the set of hosts to access the host data on the storage device of the target array using the multipath I/O software.

2. A method as in claim 1 wherein the next SCSI instruction sent from the set of hosts to the storage device of the source array is a SCSI input/output (I/O) command which is constructed and arranged to access the storage device of the source array; and wherein the source response has, as the reservation cleared indicator, a SCSI reset status code in key code qualifier (KCQ) format, the SCSI reset status code indicating that the storage device of the source array has been reset in order to cause the set of hosts to establish the second SCSI reservation to the storage device of the target array using the multipath I/O software.

3. A method as in claim 2 wherein establishing the second SCSI reservation in place of the first SCSI reservation includes:

receiving a SCSI reservation instruction sent from the set of hosts to the storage device of the target array, and forming the second SCSI reservation in response to the SCSI reservation instruction.

4. A method as in claim 3, further comprising:

prior to receiving the SCSI reservation instruction and forming the second SCSI reservation, receiving a SCSI command sent from the set of hosts to the storage device of the target array, and outputting a target response having the reservation cleared indicator in response to the SCSI command.

5. A method as in claim 4 wherein outputting the target response having the reservation cleared indicator includes:

sending the SCSI reset status code in key code qualifier KCQ format, the SCSI reset status code indicating that the storage device of the target array has been reset during the data transfer operation.

6. A method as in claim 3, further comprising:

after forming the second SCSI reservation, (i) receiving a read/write SCSI instruction sent from the set of hosts to the storage device of the target array, and (ii) performing a read/write operation on the storage device of the target array in response to the read/write SCSI instruction.

7. A method as in claim 6 wherein performing the read/write SCSI instruction on the storage device of the target array includes:

obtaining host data identified by the read/write SCSI instruction sent from the storage device of the source array in a hot pull manner and relaying that host data from the source array to the set of hosts.

8. A method as in claim 1 wherein providing the active-to-passive instruction to the source array includes:

sending the active-to-passive instruction from the target array to the storage device of the source array in response to a data migration command.

9. A method as in claim 8 wherein sending the active-to-passive instruction from the target array to the storage device of the source array includes:

transmitting, as the active-to-passive instruction, a vendor-unique SCSI command from the target array to the source array, and in response to the vendor-unique SCSI command, receiving a response indicating that the storage device of the source array has transitioned from the active mode to the passive mode.

10. A method as in claim 1 wherein the source array is constructed and arranged to automatically transition the storage device from the passive mode back to the active mode in response to a detection of a failure event in which the source array does not receive a heartbeat signal from the target array during a predefined amount of time; and wherein the method further comprises periodically sending a new heartbeat signal from the target array to the source array to prevent the source array from automatically transitioning the storage device of the source array from the passive mode back to the active mode.

11. A data storage array to operate as a target array involved in a migration process in which data is migrated from a storage device of a source array to a storage device of the target array while preserving small computer system interface (SCSI) reservation compliance, each storage device being capable of operating in (i) an active mode in which that storage device is permitted to perform host read, write and reservation operations and (ii) a passive mode in which that storage device is not permitted to perform host read, write and reservation operations, the data storage array comprising:

an external interface;

a group of storage devices; and processing circuitry coupled to the external interface and the group of storage devices, the processing circuitry being constructed and arranged to:

while a first SCSI reservation exists which enables a set of hosts to access host data on the storage device of the source array using multipath I/O software, providing an active-to-passive instruction to the source array through the external interface, the active-to-passive instruction directing the source array to (i) transition the storage device of the source array from the active mode to the passive mode and (ii) upon receipt of a next SCSI instruction sent from the set of hosts to the storage device of the source array, output a source response to the set of hosts, the source response having a reservation cleared indicator indicating that the first SCSI reservation has been cleared on the source array, after the storage device of the source array transitions from the active mode to the passive mode, transitioning the storage device of the target array from the passive mode to the active mode and beginning a data transfer operation which transfers data from the storage device of the source array to the storage device of the target array, and after the storage device of the target array transitions from the passive mode to the active mode, establishing a second SCSI reservation in place of the first SCSI reservation, the second SCSI reservation enabling the set of hosts to access the host data on the storage device of the target array using the multipath I/O software during the data transfer operation.

12. A data storage array as in claim 11 wherein the SCSI instruction sent from the set of hosts to the storage device of the source array is a SCSI input/output (I/O) command which is constructed and arranged to access the storage device of the source array; and wherein the source response has, as the reservation cleared indicator, a SCSI reset status code in key code qualifier (KCQ) format, the SCSI reset status code indicating that the storage device of the source array has been reset in order to cause the set of hosts to establish the second SCSI reservation to the storage device of the target array using the multipath I/O software.

13. A data storage array as in claim 11 wherein the source array is constructed and arranged to automatically transition the storage device from the passive mode back to the active mode in response to a detection of a failure event in which the source array does not receive a heartbeat signal from the target array during a predefined amount of time; and wherein the processing circuitry is further constructed and arranged to periodically send a new heartbeat signal from the target array to the source array to prevent the source array from automatically transitioning the storage device of the source array from the passive mode back to the active mode.

14. A computer program product which includes a non-transitory computer readable storage medium storing instructions to perform, when executed on a computerized processor of a target array, a method of migrating data from a storage device of a source array to a storage device of the target array while preserving small computer system interface (SCSI) reservation compliance, each storage device being capable of operating in (i) an active mode in which that storage device is permitted to perform read, write and reservation operations and (ii) a passive mode in which that storage device is not permitted to perform read, write and reservation operations, the method comprising:

while a first SCSI reservation exists which enables a set of hosts to access host data on the storage device of the source array using multipath I/O software, providing an active-to-passive instruction to the source array, the active-to-passive instruction directing the source array to (i) transition the storage device of the source array from the active mode to the passive mode and (ii) upon receipt of a next SCSI instruction sent from the set of hosts to the storage device of the source array, output a source response to the set of hosts, the source response having a reservation cleared indicator indicating that the first SCSI reservation has been cleared on the source array;

after the storage device of the source array transitions from the active mode to the passive mode, transitioning the storage device of the target array from the passive mode to the active mode and beginning a data transfer operation which transfers data from the storage device of the source array to the storage device of the target array; and after the storage device of the target array transitions from the passive mode to the active mode, establishing a second SCSI reservation in place of the first SCSI reservation, the second SCSI reservation enabling the set of hosts to access the host data on the storage device of the target array using the multipath I/O software.

15. A method of migrating data from a storage device of a source array to a storage device of a target array while preserving small computer system interface (SCSI) reservation compliance, each storage device being capable of operating in (i) an active mode in which that storage device is permitted to perform host read, write and reservation operations and (ii) a passive mode in which that storage device is not permitted to perform host read, write and reservation operations, the method comprising:

while a first SCSI reservation exists which enables a set of hosts to access host data on the storage device of the source array using multipath I/O software, receiving an active-to-passive instruction from the target array, the active-to-passive instruction directing the source array to (i) transition the storage device of the source array from the active mode to the passive mode and (ii) upon receipt of a next SCSI instruction sent from the set of hosts to the storage device of the source array, output a source response to the set of hosts, the source response having a reservation cleared indicator indicating that the first SCSI reservation has been cleared on the source array;

after the storage device of the source array transitions from the active mode to the passive mode, informing the target array that the storage device of the target array has transitioned from the passive mode to the active mode; and after informing the target array, beginning a data transfer operation which transfers data from the storage device of the source array to the storage device of the target array.

16. A method as in claim 15 wherein the SCSI instruction sent from the set of hosts to the storage device of the source array is a SCSI input/output (I/O) command which is constructed and arranged to access the storage device of the source array; and wherein the source response has, as the reservation cleared indicator, a SCSI reset status code in key code qualifier (KCQ) format, the SCSI reset status code indicating that the storage device of the source array has been reset in order to cause the set of hosts to establish the second SCSI reservation to the storage device of the target array using the multipath I/O software.

17. A method as in claim 15 wherein the source array is constructed and arranged to automatically transition the storage device from the passive mode back to the active mode in response to a detection of a failure event in which the source array does not receive a heartbeat signal from the target array during a predefined amount of time; and wherein the method further comprises periodically receiving a new heartbeat signal from the target array to prevent the source array from automatically transitioning the storage device of the source array from the passive mode back to the active mode.

18. A data storage array to operate as a source array involved in a migration process in which data is migrated from a storage device of the source array to a storage device of a target array while preserving small computer system interface (SCSI) reservation compliance, each storage device being capable of operating in (i) an active mode in which that storage device is permitted to perform host read, write and reservation operations and (ii) a passive mode in which that storage device is not permitted to perform host read, write and reservation operations, the data storage array comprising:
- an external interface;
- a group of storage devices; and
- processing circuitry coupled to the external interface and the group of storage devices, the processing circuitry being constructed and arranged to:
  - while a first SCSI reservation exists which enables a set of hosts to access host data on the storage device of the source array using multipath I/O software, receiving an active-to-passive instruction from the target array, the active-to-passive instruction directing the source array to (i) transition the storage device of the source array from the active mode to the passive mode and (ii) upon receipt of a next SCSI instruction sent from the set of hosts to the storage device of the source array, output a source response to the set of hosts, the source response having a reservation cleared indicator indicating that the first SCSI reservation has been cleared on the source array;
  - after the storage device of the source array transitions from the active mode to the passive mode, informing the target array that the storage device of the target array has transitioned from the passive mode to the active mode; and
  - after informing the target array, beginning a data transfer operation which transfers data from the storage device of the source array to the storage device of the target array.

19. A data storage array as in claim 18 wherein the SCSI instruction sent from the set of hosts to the storage device of the source array is a SCSI input/output (I/O) command which is constructed and arranged to access the storage device of the source array; and
wherein the source response has, as the reservation cleared indicator, a SCSI reset status code in key code qualifier (KCQ) format, the SCSI reset status code indicating that the storage device of the source array has been reset in order to cause the set of hosts to establish the second SCSI reservation to the storage device of the target array using the multipath I/O software.

20. A data storage array as in claim 18 wherein the source array is constructed and arranged to automatically transition the storage device from the passive mode back to the active mode in response to a detection of a failure event in which the source array does not receive a heartbeat signal from the target array during a predefined amount of time; and
wherein the method further comprises periodically receiving a new heartbeat signal from the target array to prevent the source array from automatically transitioning the storage device of the source array from the passive mode back to the active mode.

21. A computer program product which includes a non-transitory computer readable storage medium storing instructions to perform, when executed on a computerized processor of a source array, a method of migrating data from a storage device of the source array to a storage device of a target array while preserving small computer system interface (SCSI) reservation compliance, each storage device being capable of operating in (i) an active mode in which that storage device is permitted to perform read, write and reservation operations and (ii) a passive mode in which that storage device is not permitted to perform read, write and reservation operations, the method comprising:
- while a first SCSI reservation exists which enables a set of hosts to access host data on the storage device of the source array using multipath I/O software, receiving an active-to-passive instruction from the target array, the active-to-passive instruction directing the source array to (i) transition the storage device of the source array from the active mode to the passive mode and (ii) upon receipt of a next SCSI instruction sent from the set of hosts to the storage device of the source array, output a source response to the set of hosts, the source response having a reservation cleared indicator indicating that the first SCSI reservation has been cleared on the source array;
- after the storage device of the source array transitions from the active mode to the passive mode, informing the target array that the storage device of the target array has transitioned from the passive mode to the active mode; and
- after informing the target array, beginning a data transfer operation which transfers data from the storage device of the source array to the storage device of the target array.

22. A method as in claim 1,
wherein the source array maintains a table having a set of entries, each entry of the set of entries corresponding to a storage device of the source array and including an indicator field having a binary value corresponding to whether the storage device to which the entry corresponds is confirmed to send the reservation cleared indicator in response to receipt of the next SCSI command from the set of hosts,
wherein outputting the source response to the set of hosts includes:
- setting the binary value of the indicator field to 'YES' to indicate that the storage device is confirmed to send the reservation cleared indicator in response to receipt of the next SCSI command from the set of hosts.

23. A method as in claim 22,
wherein the table maintained by the source array further includes a device ID field, a mode field indicating whether the storage device is active or passive, a reservation field indicating whether a SCSI reservation exists for the storage drive, and a reservation owner field indicating the set of hosts owning the SCSI reservation if the SCSI reservation exists,
wherein transitioning the storage device of the source array from the active mode to the passive mode includes:
- setting a value of the mode field to 'passive'; and
- clearing contents of the reservation owner field,
wherein outputting the source response to the set of hosts further includes:
- after outputting the source response to the set of hosts, changing the binary value of the indicator field from 'YES' to 'NO' to indicate that the storage device is not confirmed to send the reservation cleared indicator in response to receipt of the next SCSI command from the set of hosts.

* * * * *